United States Patent
Baginski

(10) Patent No.: US 9,151,548 B2
(45) Date of Patent: Oct. 6, 2015

(54) HIGH TEMPERATURE HEAT EXCHANGER CORNER METAL TEMPERATURE ATTENUATOR

(75) Inventor: Ben Baginski, Santa Ana, CA (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 496 days.

(21) Appl. No.: 13/208,309

(22) Filed: Aug. 11, 2011

(65) Prior Publication Data

US 2013/0037247 A1 Feb. 14, 2013

(51) Int. Cl.
| | |
|---|---|
| *B23K 31/02* | (2006.01) |
| *F28D 1/03* | (2006.01) |
| *F28D 1/00* | (2006.01) |
| *F28F 9/02* | (2006.01) |
| *B23K 1/00* | (2006.01) |
| *F28F 9/20* | (2006.01) |
| *F28F 13/06* | (2006.01) |
| *F28F 13/14* | (2006.01) |
| *F28D 9/00* | (2006.01) |

(52) U.S. Cl.
CPC ............... *F28F 9/028* (2013.01); *B23K 1/0012* (2013.01); *F28D 9/00* (2013.01); *F28F 9/20* (2013.01); *F28F 13/06* (2013.01); *F28F 13/14* (2013.01); *F28F 2265/10* (2013.01); *F28F 2270/00* (2013.01)

(58) Field of Classification Search
CPC ... B23K 1/0012; B23K 2201/14; F28F 1/128; F28F 1/022; F28F 13/06; F28F 13/14; F28F 2275/04; F28F 9/02; F28F 9/20
USPC ............................. 228/157, 183; 165/151, 182
See application file for complete search history.

(56) References Cited

U.S. PATENT DOCUMENTS

| | | | |
|---|---|---|---|
| 2,595,308 | A | 5/1952 | Simpelaar |
| 3,165,151 | A | 1/1965 | Astrup et al. |

(Continued)

FOREIGN PATENT DOCUMENTS

| | | |
|---|---|---|
| EP | 0 177 565 A2 | 9/1984 |
| GB | 686 431 A | 1/1953 |

(Continued)

OTHER PUBLICATIONS

European Patent Office (EPO), Office Action dated Feb. 1, 2013.

*Primary Examiner* — Erin Saad
(74) *Attorney, Agent, or Firm* — Shimokaji IP

(57) ABSTRACT

A heat exchanger has a corner metal temperature attenuator that may attenuate a localized stack wise temperature gradient. The corner metal temperature attenuator may locally reduce or eliminate the source of large amplitude temperature swings near the end of the stack of passages which are correlated with the areas of greatest low cycle fatigue (LCF) damage. The corner metal temperature attenuator may locally block the inlet flow to every other (alternating) passage in the stack, beginning with the second passage inward from each end of the stack. The width of the blocked flow at any passage can be minimized using existing analytical methods to determine the threshold at which the metal damage index (DI) falls below a predetermined threshold at that location. Since the damage index naturally attenuates toward the passage stack midplane, the width of the blocked flow may also be reduced moving toward the stack midplane and eventually may go to zero blockage for all remaining alternating passages.

6 Claims, 6 Drawing Sheets

(56) References Cited

U.S. PATENT DOCUMENTS

| | | |
|---|---|---|
| 3,196,942 A | 7/1965 | Prentiss |
| 3,948,317 A | 4/1976 | Moore |
| 4,227,570 A | 10/1980 | Crews |
| 4,844,151 A | 7/1989 | Cohen |
| 5,540,899 A | 7/1996 | Koves |
| 6,675,746 B2 | 1/2004 | Gerstmann et al. |
| 2005/0022982 A1 | 2/2005 | Dilley et al. |
| 2010/0147499 A1 | 6/2010 | Arai et al. |
| 2012/0000633 A1* | 1/2012 | Malugani et al. ............ 165/157 |
| 2013/0062042 A1* | 3/2013 | Dinulescu .................... 165/166 |

FOREIGN PATENT DOCUMENTS

| | | |
|---|---|---|
| WO | WO 2010076477 A1 * | 7/2010 |
| WO | WO 2011129695 A2 * | 10/2011 |

* cited by examiner

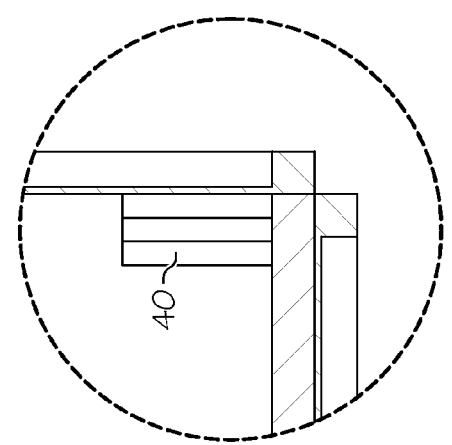
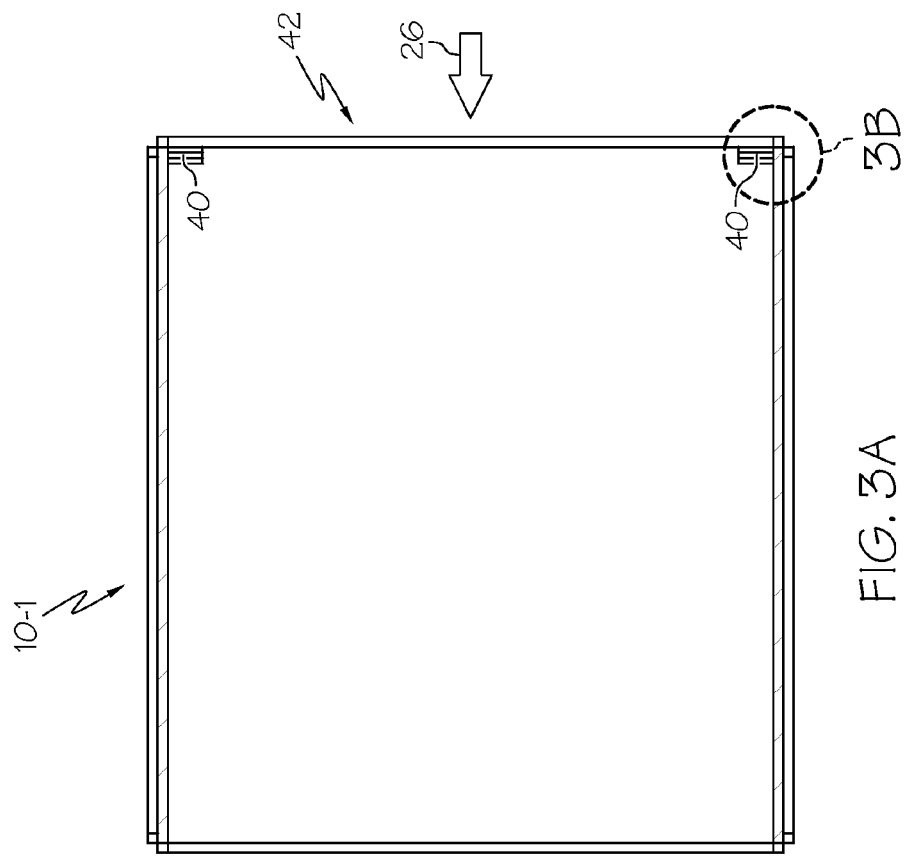

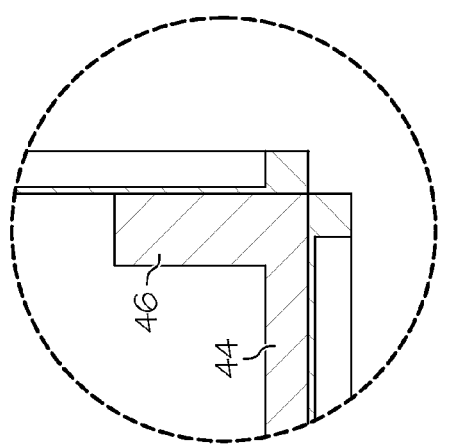
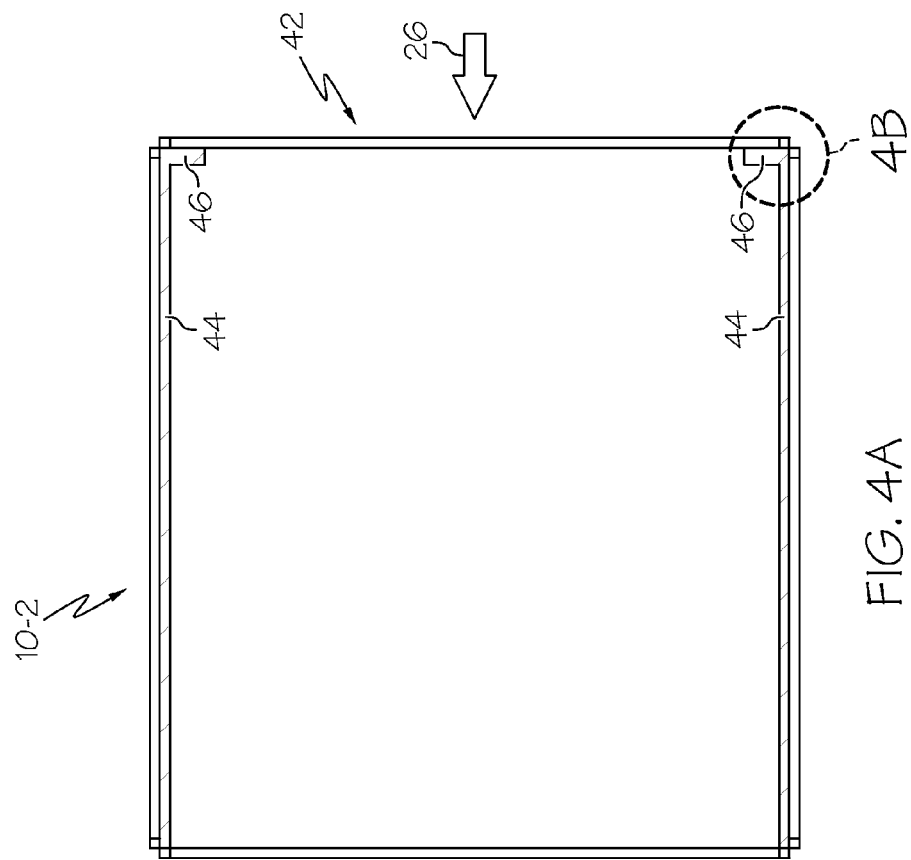

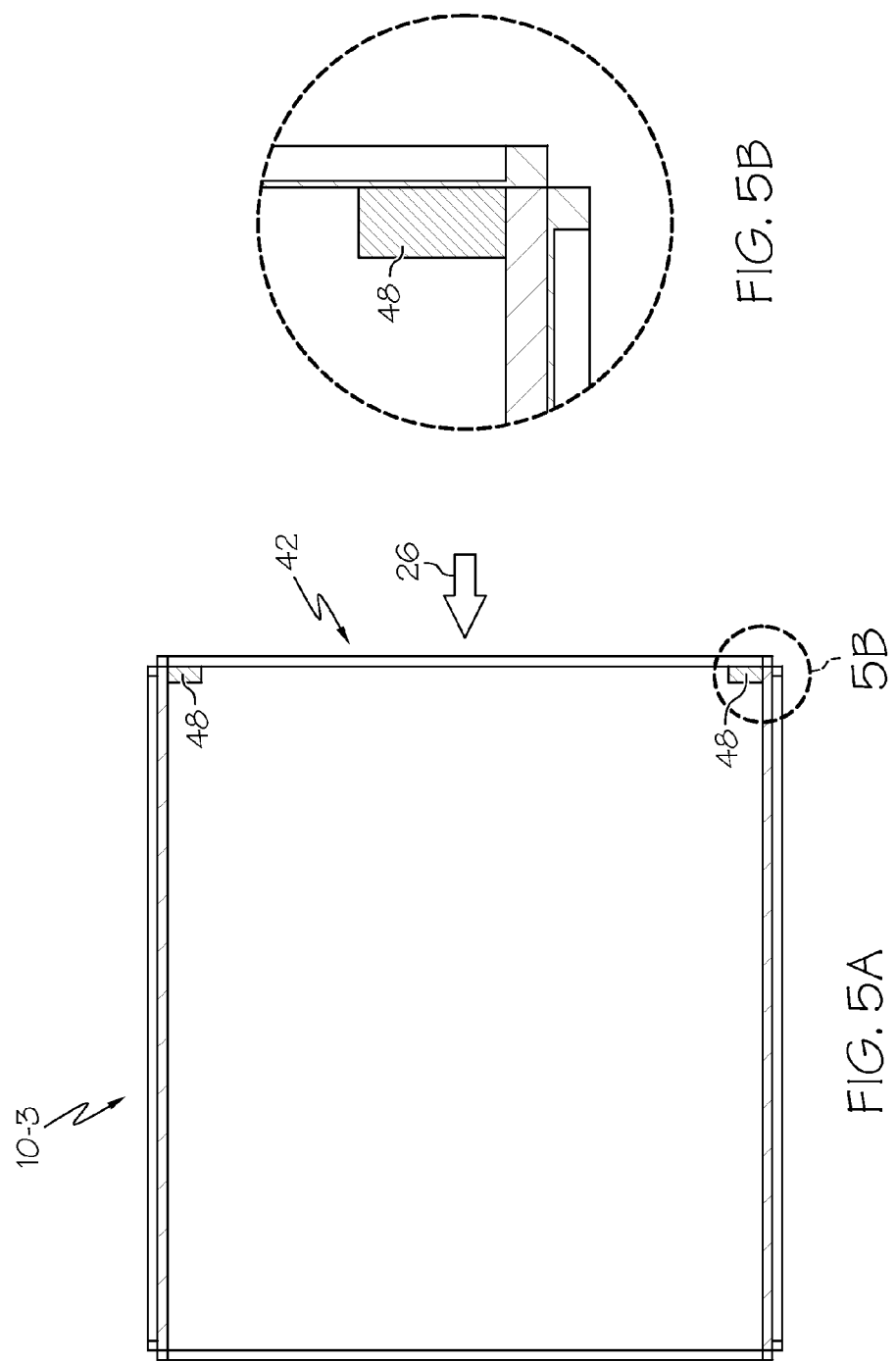

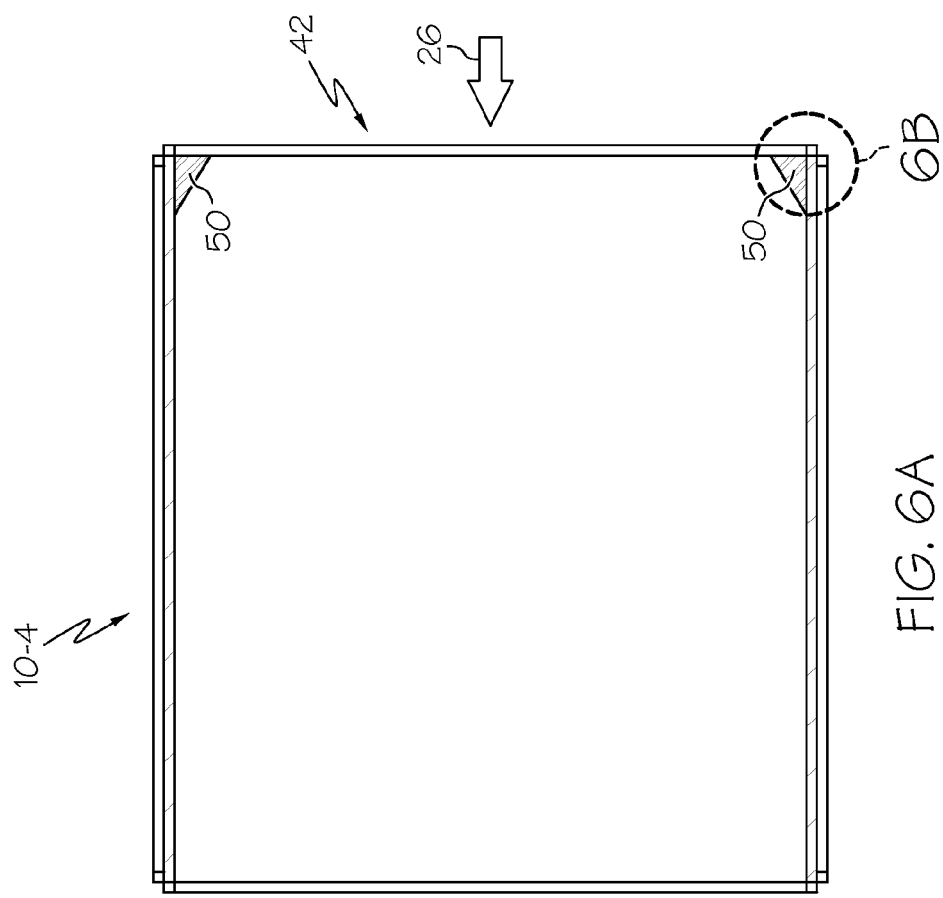

US 9,151,548 B2

HIGH TEMPERATURE HEAT EXCHANGER CORNER METAL TEMPERATURE ATTENUATOR

BACKGROUND OF THE INVENTION

The present invention relates to apparatus and methods in the field of heat exchangers and, more particularly, to apparatus and methods for controlling the flow through a heat exchanger to minimize incidence of low cycle fatigue metal damage.

The usable life of a typical high temperature cross- or counter-flow, plate-fin heat exchanger, e.g., an aircraft pre-cooler, is often limited by low cycle fatigue (LCF) induced by large air temperature or air mass flow excursions which occur in the flow through the heat exchanger during repeated vehicle maneuvers, repeated engine start/stop cycles, or repeated ground maintenance cycles.

Analysis, testing and field operations have identified that the vulnerable areas for LCF are in the extreme corner areas of one of the inlet faces, typically the corners of the hot inlet face. Thermal/stress analysis has indicated that stack-wise temperature gradients generated at the corner of the alternating stacked passages are correlated with high strain ranges which accelerate the initiation and propagation of cracks in the metal of the separator plates (tube-sheets) which segregate the alternating hot/cold flows. Leakage between passages initiates and increases until some specified loss of performance ends the useful life of the heat exchanger.

Typical strategies for extending the useful LCF life of a heat exchanger involve increasing the gauge (thickness) of various metal components used to construct the entire heat exchanger. These strategies usually add significant weight to the heat exchanger and often degrade overall performance since metal is added to areas that are not associated with a described localized problem. Because these are "whole" heat exchanger approaches to a localized problem, they quickly become limited in the extent to which they can mitigate the scale of the localized problem. They are also limited in applicability since design changes become more difficult to implement at the point in the timeline when LCF issues become illuminated analytically.

As can be seen, there is a need for a targeted, localized approach to attenuating a localized stack-wise temperature gradient which has greater leverage to abate a large range of gradients while having minimal impact on heat exchanger design, weight and performance.

SUMMARY OF THE INVENTION

In one aspect of the present invention, a heat exchanger comprises a corner metal temperature attenuator adapted to block inlet flow to every other passage in a stack of passages in the heat exchanger, beginning with a second passage inward from each end of the stack.

In another aspect of the present invention, a plate fin heat exchanger comprises a first plurality of passages, beginning with a first passage adjacent to a sidewall of the heat exchanger, adapted to accept a first fluid flow; a second plurality of passages, beginning with a second passage adjacent to the sidewall of the heat exchanger, adapted to accept a second fluid flow; a plurality of fins disposed between alternating passages of the first plurality of passages and the second plurality of passages; and a corner metal temperature attenuator adapted to block a portion of the second fluid flow.

In a further aspect of the present invention, a method for reducing low cycle fatigue metal damage in a plate fin heat exchanger comprises blocking a portion of flow through the second and alternating passages of the heat exchanger, wherein the flow is blocked in corners of an inlet face of the heat exchanger.

These and other features, aspects and advantages of the present invention will become better understood with reference to the following drawings, description and claims.

BRIEF DESCRIPTION OF THE DRAWINGS

FIG. 3A is cross-sectional view of a plate-fin heat exchanger having transverse plain fin segments disposed to act as a corner metal temperature attenuator, according to another exemplary embodiment of the present invention;

FIG. 3B is a close-up view taken about circle 3B of FIG. 3A;

FIG. 4A is cross-sectional view of a plate-fin heat exchanger having bent header bar segments disposed to act as a corner metal temperature attenuator, according to another exemplary embodiment of the present invention;

FIG. 4B is a close-up view taken about circle 4B of FIG. 4A;

FIG. 5A is cross-sectional view of a plate-fin heat exchanger having brazed header bar segments disposed to act as a corner metal temperature attenuator, according to another exemplary embodiment of the present invention;

FIG. 5B is a close-up view taken about circle 5B of FIG. 5A;

FIG. 6A is cross-sectional view of a plate-fin heat exchanger having brazed header bar segments extending into the flow passages disposed to act as a corner metal temperature attenuator, according to another exemplary embodiment of the present invention; and FIG. 6B is a close-up view taken about circle 6B of FIG. 6A.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide a heat exchanger having a corner metal temperature attenuator that may attenuate a localized stack wise temperature gradient. The corner metal temperature attenuator may locally reduce or eliminate the source of large amplitude temperature swings near the end of the stack of passages which are correlated with the areas of greatest low cycle fatigue (LCF) damage. The corner metal temperature attenuator may locally block the inlet flow to every other (alternating) passage in the stack, beginning with the second passage inward from each end of the stack. The width of the blocked flow at any passage can be minimized using existing analytical methods to determine the threshold at which the metal damage index (DI) falls below a predetermined threshold at that location. Since the damage index naturally attenuates toward the passage stack midplane, the width of the blocked flow may also be reduced moving toward the stack midplane and eventually may go to zero blockage for all remaining alternating passages.

Figure 1:
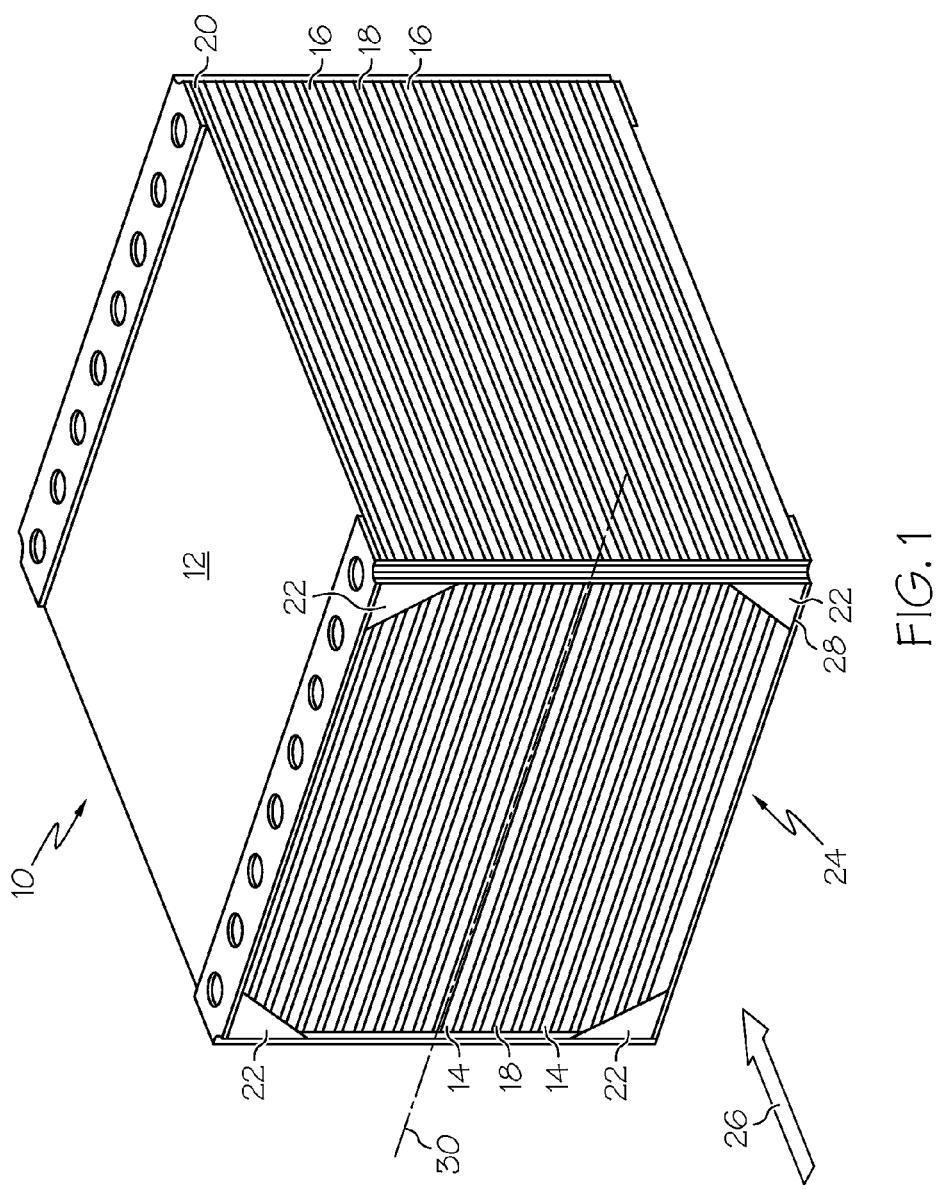
FIG. 1 is perspective view of a plate-fin heat exchanger having a corner metal temperature attenuator according to an exemplary embodiment of the present invention.

Referring to FIG. 1, embodiments of the present invention may target the local areas of a heat exchanger core 10 that may exhibit the highest incidence of LCF metal damage. An oscillating stack-wise thermal gradient may begin at the location of the heat exchanger sideplate 12. The sideplates 12 may bookend the entire stack of alternating hot passages 14 that are a second plurality of passages adapted to accept a second fluid flow and cold passages 16 that are a first plurality of passages adapted to accept a second fluid flow. The stack of alternating hot passages 14 and cold passages 16 are themselves separated by metal separator plates 18 called tubesheets. Whether the base temperature is hot or cold may be determined primarily by the flow through an outer passage 20 just inside the sideplate 12. If there is cold flow through the outer passage 20, then the next passage inward will be a hot passage. This second passage (hot) may drive an increase in temperature inward down through the stack. The next alternating passage will be cold and hence there may be a turn in the metal temperatures toward the cold flow. These alternating peaks and valleys of temperature may become more cyclic as the stack geometry becomes regular and as the edge effects near the sideplate 12 are attenuated.

In the first few passages, where both the thermal and structure edge effects are most pronounced, and where the heat exchanger geometry may be least regular, the highest stackwise gradients couple with the least structural rigidity to form corner areas of high strain and hence, high damage.

In FIG. 1, corner blocking gussets 22 may be attached to the heat exchanger core 10. The corner blocking gussets 22 may include four right-triangular shaped, thin metal gussets brazed or welded to an inlet core face 24 in each of the four corners of the inlet core face 24 which feeds the $2^{nd}$ and every alternating passage. The triangular profile may be normal to flow (as indicated by arrow 26), thus blocking the flow. A base 28 of the corner blocking gussets 22 may be attached nearest to the sideplate 12 with the triangle tapering toward a centerline 30 (indicated by a point at the core face 24) of the passages 14. The height of the gussets 22 may be determined by analytical methods which verify that no further passage requires blocked flow in order to have the maximum DI of the metal in that passage at or below a predetermined design goal.

Figure 2:
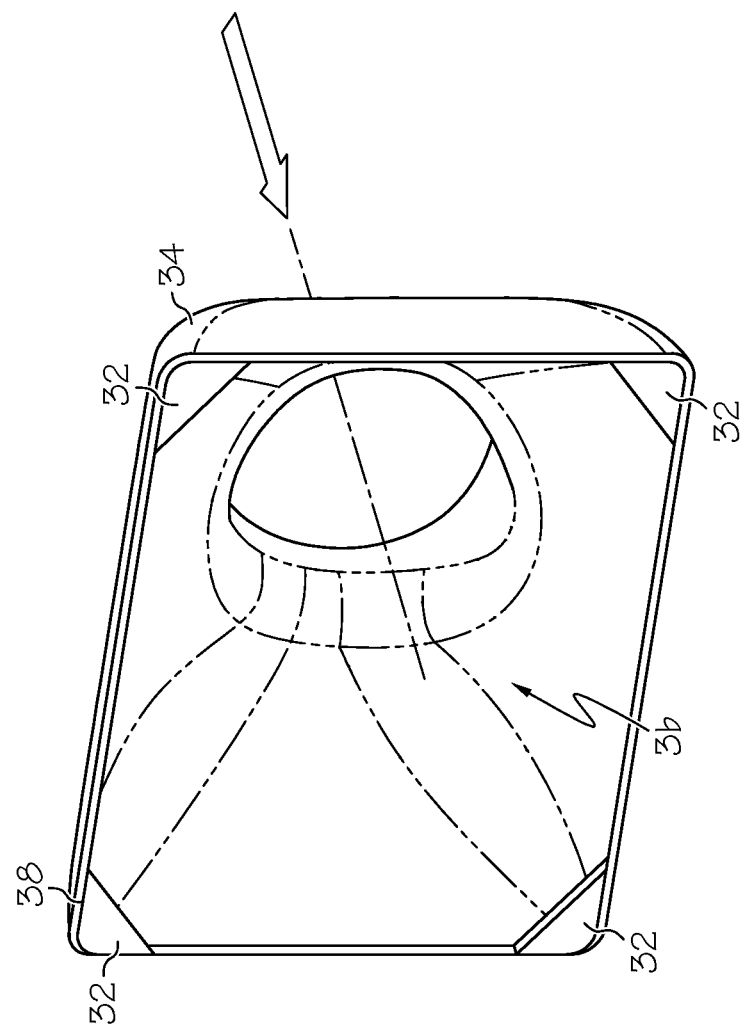
FIG. 2 is perspective view of a plate-fin heat exchanger manifold having a corner metal temperature attenuator according to another exemplary embodiment of the present invention.

Referring now to FIG. 2, corner blocking gusset 32 may be attached to an inlet manifold 34 that may feed the flow 26 at the face 24 of the heat exchanger core 10 (see FIG. 1). Four right-trangular shaped, thin metal gussets 32 may be brazed or welded to an open face 36 of the inlet manifold 34 in each of the four corners of the face 36 that feeds the second and every alternating passage. Thus, when the manifold 34 is welded to the face 24, the gussets 32 may block the flow in the plane just before the flow enters the heat exchanger core 10. The triangular profile may be normal to flow, thus blocking the flow. A base 38 of the gussets 32 may be attached nearest to the sideplate 12 with the gusset 32 tapering toward the centerline 30 of the stack of passages 14. The height of the gussets 32 may be determined by analytical methods which may verify that no further passage requires blocked flow in order to have the maximum DI of the metal in that passage at or below a predetermined design goal. This method is similar to the method shown in FIG. 1, but the gussets 32 attach to the manifold 36 instead of the core itself.

While the gussets 22, 32 of the above methods are shown as flat, the gussets 22, 32 may project away from the core face with a smooth profile to help reduce the effect on pressure drop, so long as the projected blocking profile on the core face meets specifications.

Referring now to FIGS. 3A and 3B, a transverse plain fin segment 40 may be inserted and brazed into the flow passages 14 (see FIG. 1) of a heat exchanger core 10-1. Plain fin segments 40 of the same height as the passage fin matrix and of a length determined by an analysis for the blocking width may be inserted into a notch (not shown) in the fin matrix for each of the desired edge-blocked flow passages. The fin segments 40 may be placed so that a fin wall is transverse to flow (indicated by arrow 26), thus blocking the flow at a leading edge 42 of the passage at each of its edges. For example, two plain fin segments 40 per passage may be placed in the notch in the functional fin matrix and up against each edge of the passages and with a predetermined width sufficient to reduce the DI in that passage at or below a predetermined design goal. The fin segments 40 may decrease in length (blocked width) in passages moving down away from the sideplate 12 (see FIG. 1) and toward the centerline 30 of the stack of passages. At some depth in the stack of passages, no edge flow blockage will be required.

Referring now to FIGS. 4A and 4B, a result similar to that shown in FIGS. 3A and 3B may be achieved by replacing the straight bar with an L-shaped bar 44 which has an integral L-shaped segment 46 to create a blockage to the flow 26 through a heat exchanger core 10-2.

Referring now to FIGS. 5A and 5B, a result similar to that shown in FIGS. 4A and 4B may be achieved by inserting and brazing separate header bar segments 48 to block the flow 26 through a heat exchanger core 10-3.

In the above methods, once the flow 26 passes the obstruction (for example, gussets 22, gussets 32, fin segments 40, L-shaped bar segments 46, or header bar segments 48), it may naturally expand into the full passage width. If it is desired to control the width of fluid expansion deeper into the fin matrix, then extended metal pieces 50, with a normal profile similar to the header bar segments 48 of FIGS. 5A and 5B, can be extended in the dimension extending into the passage depth, thereby affirmatively blocking flow over a fixed area of the separator plates 18 (see FIG. 1). The functional fin matrix may be notched to accommodate the profile of these edge blocking segments (extended metal pieces 50).

It should be understood, of course, that the foregoing relates to exemplary embodiments of the invention and that modifications may be made without departing from the spirit and scope of the invention as set forth in the following claims.

What is claimed is:

1. A method for reducing low cycle fatigue metal damage in a plate fin heat exchanger having a core including passages which are stacked between two sideplates, wherein all the passages extend to and not beyond a plane of an inlet core face at which the passages are open, comprising:
    blocking a portion of hot fluid flowing into the passages at corners of the inlet core face, wherein the blocking includes:
        disposing corner gussets having a triangular planar face at corners of and only on the plane of the inlet core face;
        whereby the planar faces are oriented substantially normal to the flow of hot fluid;
        whereby any one of the corner gussets reduces a width of some but less than all of the passages.

2. The method of claim 1, further comprising expanding the hot fluid after the inlet core face.

3. The method of claim 1, wherein the corner gussets are attached to the sideplates of the heat exchanger.

4. The method of claim 1, further comprising feeding the hot fluid into the plurality of second passages through an inlet manifold affixed to the inlet face of the heat exchanger.

5. The method of claim 4, wherein blocking the portion of the hot fluid is performed by corner temperature attenuators of the inlet manifold, wherein the corner temperature attenuators cover the corners of the inlet face of the heat exchanger.

6. A method for reducing low cycle fatigue metal damage in a plate fin heat exchanger having a core including passages which are stacked between two sideplates, wherein all the passages extend to and not beyond only one plane of an inlet core face at which all the passages are open, comprising:
    blocking a portion of hot fluid flowing into the passages at corners of the inlet core face,
    wherein the blocking includes:
        disposing corner gussets having a planar face at corners of and only on a fluid inlet side of the plane of the inlet core face such that the gussets do not extend to a fluid outlet side of the plane of the inlet core face;
        whereby the planar faces are oriented substantially normal to the flow of hot fluid;
        whereby any one of the corner gussets reduces a width of less than all of the passages.

\* \* \* \* \*